(12) United States Patent
Liu

(10) Patent No.: US 11,871,747 B2
(45) Date of Patent: Jan. 16, 2024

(54) CLOTHIANIDIN COMPOSITIONS AND METHODS OF USE THEREOF

(71) Applicant: Valent U.S.A. LLC, San Ramon, CA (US)

(72) Inventor: Jane Liu, Pleasanton, CA (US)

(73) Assignee: VALENT U.S.A., LLC, San Ramon, CA (US)

( * ) Notice: Subject to any disclaimer, the term of this patent is extended or adjusted under 35 U.S.C. 154(b) by 421 days.

(21) Appl. No.: 17/080,983

(22) Filed: Oct. 27, 2020

(65) Prior Publication Data

US 2021/0120819 A1 Apr. 29, 2021

Related U.S. Application Data

(60) Provisional application No. 62/926,642, filed on Oct. 28, 2019.

(51) Int. Cl.
*A01N 43/78* (2006.01)
*A01N 25/04* (2006.01)

(52) U.S. Cl.
CPC .............. *A01N 43/78* (2013.01); *A01N 25/04* (2013.01)

(58) Field of Classification Search
CPC ................................ A01N 43/78; A01N 25/04
See application file for complete search history.

(56) References Cited

U.S. PATENT DOCUMENTS

| | | | |
|---|---|---|---|
| 5,667,795 A * | 9/1997 | Fraley | C05G 3/60 424/641 |
| 2007/0207927 A1 * | 9/2007 | Rosa | A01C 1/06 504/100 |
| 2009/0143447 A1 * | 6/2009 | Arthur | A01N 25/00 514/370 |
| 2011/0245078 A1 * | 10/2011 | Tang | A01N 51/00 514/772.1 |
| 2012/0196748 A1 | 8/2012 | Zoschke et al. | |
| 2016/0185680 A1 | 6/2016 | Ramachandran | |
| 2018/0064103 A1 | 3/2018 | Moyer, IV et al. | |
| 2019/0150444 A1 | 5/2019 | Liu et al. | |

FOREIGN PATENT DOCUMENTS

WO WO-2009021985 A2 * 2/2009 ............. A01N 25/00
WO 2012/124795 A1 9/2012

OTHER PUBLICATIONS

Ken Klein, Humectant, 2006, Digital Printing of Textiles 2006 (Year: 2006).*
International Search Report and Written Opinion dated Jan. 27, 2021.
Foster B. et al., "Pluronic Triblock Copolymer Systems and Their Interactions with Ibuprofen", Langmuir, 2009, vol. 25, issue 12, pp. 6760-6766, retrieved from the Internet: < DOI: 10.1021/la900298m >; see entire document, especially, p. 6761.

* cited by examiner

*Primary Examiner* — Robert A Wax
*Assistant Examiner* — John Seungjai Kwon
(74) *Attorney, Agent, or Firm* — Wood, Phillips, Katz, Clark & Mortimer

(57) ABSTRACT

The present invention is directed to a pesticidal composition comprising clothianidin, a graft copolymer, an acrylic (type) co-polymer having a backbone containing a carboxylated ethylenically unsaturated monomer and a non-carboxylated ethylenically unsaturated monomer and optionally, a poly (ethylene oxide)-poly(propylene oxide)-poly(ethylene oxide) block copolymer having an average molecular weight from about 4950 to about 6500 and a hydrophile weight percentage from about 30% to about 50%. The present invention is further directed to a method of controlling a pest comprising applying a composition of the present invention to an area in need of pest control.

15 Claims, No Drawings

CLOTHIANIDIN COMPOSITIONS AND METHODS OF USE THEREOF

FIELD OF THE INVENTION

The present invention is directed to a pesticidal composition comprising clothianidin, a graft copolymer, an acrylic (type) co-polymer having a backbone containing a carboxylated ethylenically unsaturated monomer and a non-carboxylated ethylenically unsaturated monomer and optionally, a poly(ethylene oxide)-poly(propylene oxide)-poly(ethylene oxide) block copolymer having an average molecular weight from about 4950 to about 6500 and a hydrophile weight percentage from about 30% to about 50%. The present invention is further directed to a method of controlling a pest comprising applying a composition of the present invention to an area in need of pest control.

BACKGROUND OF THE INVENTION

Arthropod pests, including insects and mites, are one of the major threats to human welfare, exert continued stress on the food supply and transmit a broad array of medical and veterinary diseases. Insect pests can cause severe and costly damage to crops, ornamental plants and stored foods. Further, insect and mite pests transmit diseases in and among humans resulting in reduced life expectancy, reduced quality of life and increased medical costs.

Aphids are highly problematic and costly pests of cultivated plants. There are approximately 250 described species of aphids that are known to eat crops, trees and ornamental plants. Aphids feed on the nectar of plants causing decreased growth rates, low yields and death. Aphids are also vectors for many microscopic plant pathogens spreading disease from plant to plant. Efforts to control aphids include synthetic pesticide application and the introduction of natural predators. While aphids have numerous natural predators such as ladybirds and parasitic wasps, predators and parasitoids alone are not effective at preventing crop plant damage by aphids. Unfortunately, aphids have also developed resistance to many common pesticides.

Another costly insect pest is wireworms. Wireworms feed primarily on grass crops. Wireworm infestations can result in serious crop damage. Wireworms are especially destructive to corn. When corn is infested by wireworm it often results in large loss of the crop.

Clothianidin is available as the active ingredient in NipsIt INSIDE®. NipsIt INSIDE® is a seed treatment that contains 47.8% w/w clothianidin and is a registered trademark of and available from Valent U.S.A. LLC. NipsIt INSIDE® has proven effective in controlling aphids and wireworms. However, NipsIt INSIDE® is not shelf stable for extended periods.

Accordingly, there is a need in the art for a stable clothianidin composition.

SUMMARY OF THE INVENTION

The present invention is directed to a pesticidal composition comprising clothianidin, a graft copolymer, an acrylic (type) co-polymer having a backbone containing a carboxylated ethylenically unsaturated monomer and a non-carboxylated ethylenically unsaturated monomer and optionally, a poly(ethylene oxide)-poly(propylene oxide)-poly(ethylene oxide) block copolymer having an average molecular weight from about 4950 to about 6500 and a hydrophile weight percentage from about 30% to about 50%.

The present invention is further directed to a method of controlling a pest comprising applying a composition of the present invention to an area in need of pest control.

DETAILED DESCRIPTION OF THE INVENTION

Applicant has discovered a unique mixture of surfactants capable of forming a shelf stable composition of clothianidin.

In one embodiment, the present invention is directed to a pesticidal composition comprising clothianidin, a graft copolymer, an acrylic (type) co-polymer having a backbone containing a carboxylated ethylenically unsaturated monomer and a non-carboxylated ethylenically unsaturated monomer, and a poly(ethylene oxide)-poly(propylene oxide)-poly(ethylene oxide) block copolymer having an average molecular weight from about 4950 to about 6500 and a hydrophile weight percentage from about 30% to about 50%.

In a preferred embodiment, the present invention is directed to a pesticidal composition comprising:
  from about 10% to about 60% w/w clothianidin;
  from about 1% to about 10% w/w of a graft copolymer;
  from about 0.1% to about 10% w/w of an acrylic (type) co-polymer having a backbone containing a carboxylated ethylenically unsaturated monomer and a non-carboxylated ethylenically unsaturated monomer;
  optionally, from about 0.1% to about 10% w/w of a poly(ethylene oxide)-poly(propylene oxide)-poly(ethylene oxide) block copolymer having an average molecular weight of 4950 and a hydrophile weight percentage of 30%.

In a more preferred embodiment, the present invention is directed to a composition comprising:
  about 47.8% w/w clothianidin;
  about 5.0% w/w of a graft copolymer;
  about 1.5% w/w of an acrylic (type) co-polymer having a backbone containing a carboxylated ethylenically unsaturated monomer and a non-carboxylated ethylenically unsaturated monomer; and
  about 0.5% w/w of a poly(ethylene oxide)-poly(propylene oxide)-poly(ethylene oxide) block copolymer having an average molecular weight of 4950 and a hydrophile weight percentage of 30%.

Clothianidin may be present in compositions of the present invention at a concentration from about 1% to about 60% w/w, preferably from about 10% to about 60% w/w, even more preferably from about 40% to about 60% w/w and most preferably about 47.8% w/w.

A graft copolymer may be present in compositions of the present invention at a concentration from about 1% to about 20% w/w, preferably from about 1% to about 10% w/w, even more preferably from about 3% to about 7% w/w and most preferably about 5.0% w/w. In a preferred embodiment the graft copolymer is Tersperse® 2500, Atlox® 4913 or Stepflow® 4000.

An acrylic (type) co-polymer having a backbone containing a carboxylated ethylenically unsaturated monomer and a non-carboxylated ethylenically unsaturated monomer may be present in compositions of the present invention at a concentration from about 0.1% to about 20% w/w, preferably from about 0.1% to about 10% w/w, even more preferably from about 0.5% to about 2.5% w/w and most preferably about 1.5% w/w. In a preferred embodiment the acrylic (type) co-polymer having a backbone containing a carboxylated ethylenically unsaturated monomer and a non-carboxylated ethylenically unsaturated monomer is Envipol® 871.

A poly(ethylene oxide)-poly(propylene oxide)-poly(ethylene oxide) block copolymer having an average molecular weight from about 4950 to about 6500 and a hydrophile weight percentage from about 30% to about 50% may be present in compositions of the present invention at a concentration from about 0.1% to about 20% w/w, preferably from about 0.1% to about 10% w/w, even more preferably from about 0.1% to about 1% w/w and most preferably about 0.5% w/w. In a preferred embodiment the non-carboxylated ethylenically unsaturated monomer and a poly (ethylene oxide)-poly(propylene oxide)-poly(ethylene oxide) block copolymer having an average molecular weight of 4950 and a hydrophile weight percentage of 30% is Pluronic® P103.

Compositions of the present invention may further comprise one or more excipients selected from the group consisting of a slip agent, a liquid humectant, an anti-foam agent, a polymer emulsion, a preservative and a thickener.

A slip agent suitable for use in the present invention includes, but is not limited to, a 25% emulsion of carnauba wax in water and a micronized polyethylene glycol wax having an NPIRI grind gauge reading of 1.0 to 1.5. MPP-611XF is one source of a micronized polyethylene glycol wax having an NPIRI grind gauge reading of 1.0 to 1.5 and is available from Micro Powders, Inc.

Slip agents may be present in compositions of the present invention at a concentration from about 1% to about 10% w/w, preferably from about 1% to about 5% w/w, more preferably form about 2% to about 4% w/w and even more preferably at about 3% w/w.

Liquid humectants suitable for use in the present invention include, but are not limited to, glycerol, polypropylene glycols and diethylene or polyethylene glycols, ethyl hexanediol, hexylene glycol, butylene glycol, propylene glycol, dipropylene glycol, tripropylene glycol, polypropylene-5-laureth-5, polyglycerol cocoate, sorbitol, fructose, glycine, inositol, panthenol and mixtures thereof. In a preferred embodiment the liquid humectant is glycerol.

Liquid humectants may be present in compositions of the present invention at a concentration from about 1% to about 20% w/w, preferably from about 1% to about 10% w/w, more preferably form about 5% to about 7% w/w and even more preferably at about 6% w/w.

Anti-foam agents suitable for use in the present invention include, but are not limited to, silicone antifoaming agents including silicone emulsions, vegetable oils, acetylenic glycols, and high molecular weight adducts of propylene oxide and lower polyoxyethylene and polyoxypropylene block polymers (wherein the number of octyl-, nonly- and phenylpolyoxyethylene/ethylene oxide units is >5) and long-chain alcohols, 2,4,7,9-tetramethyl-5-decyne-4,7-diol (Surfynol® 104PG-50 (CAS #126-86-3) is one source of 2,4,7, 9-tetramethyl-5-decyne-4,7-diol and is a registered trademark of and available from Air Products and Chemicals Inc.) and mixtures thereof. In a preferred embodiment, the anti-foam agent is a silicone emulsion.

Anti-foam agents may be present in compositions of the present invention at a concentration from about 0.01% to about 1% w/w, preferably from about 0.05% to about 0.5% w/w, more preferably form about 0.2% to about 0.4% w/w and even more preferably at about 0.3% w/w.

A polymer emulsion suitable for use in the present invention includes, but are not limited to, an acrylic copolymer in an aqueous solution and vinyl acetate-ethylene copolymer in water. Emulson AG Coat US and Emulson STFS are each one source of an acrylic copolymer in aqueous emulsion. Emulson AG Coat US and Emulson STFS are available from Lamberti SPA. Eco VAE 401 is one source of a vinyl acetate-ethylene copolymer in water and is available from Celelanese.

Polymer emulsions may be present in compositions of the present invention at a concentration from about 1% to about 10% w/w, preferably from about 1% to about 5% w/w, more preferably form about 2% to about 4% w/w and even more preferably at about 3% w/w.

Thickeners suitable for use in the present invention include, but are not limited to, hydroxyethyl cellulose, magnesium aluminum silicate, attapulgite, hydrophilic fumed silica, aluminum oxide, xanthan gum and mixtures thereof. In a preferred embodiment, the thickener is a mixture of magnesium aluminum silicate and xanthan gum.

Thickeners may be present in compositions of the present invention at a concentration from about 0.01% to about 5% w/w, preferably from about 0.01% to about 1% w/w, more preferably form about 0.05% to about 0.5% w/w and even more preferably at about 0.1% w/w.

Preservatives suitable for use in the present invention include, but are not limited to, a 1.15% 5-chloro-2-methyl-4-isothiazolin-3-one and 0.35% 2-methyl-4-isothiazolin-3-one solution in water, such as Kathon® CG/ICP (available from Rohm and Haas Company) and Legend MK® (available from Rohm and Haas Company), 19.3% 1, 2-benzisothiazolin-3-one and mixtures thereof. In a preferred embodiment the preservative is 19.3% 1, 2-benzisothiazolin-3-one.

The preservative be present in compositions of the present invention at a concentration from about 0.01% to about 5% w/w, preferably from about 0.1% to about 5% w/w, more preferably form about 0.2% to about 0.4% w/w and even more preferably at about 0.25% w/w.

Water may be present in compositions of the present invention at a concentration from about 1% to about 99% w/w, preferably from about 10% to about 89% w/w, more preferably from about 20% to about 40% w/w and even more preferably from about 30% to about 35% w/w and most preferably about 32.6% w/w.

In another embodiment the present invention is directed to methods of controlling a pest comprising applying the compositions of the invention to an area in need of pest control.

Pests that may be controlled by compositions of the present invention include, but are not limited to, aphids and wireworms.

As used herein, "aphids" refers to pests that belong to the SuperFamily Aphidoidea of Order Hemiptera.

As used herein, "wireworm" refers to pests that belong to the Family Elateridae of the Order Coleoptera.

As used herein, "controlling a pest" refers to decreasing the negative impact of the pest on plants or animals to a level that is desirable to the grower or animal.

As used herein, "an area in need of pest control" refers to any area where the pest is present during any life stage. One environment likely to be treated by the methods of the present invention includes the plants, the plant propagation material and that the pest is living on/in and the surrounding soil. The pest's environment may also include harvested plants, gardens, fields, greenhouses, or other buildings, and various indoor surfaces and structures, such as furniture including beds, and furnishings including books, clothing, etc.

As used herein, the term "plant propagation material" refers to seeds and seedlings of all kinds (fruit, tubers, and grains), clonal and micro propagated plants, and the like.

Throughout the application, the singular forms "a," "an," and "the" include plural reference unless the context clearly dictates otherwise.

As used herein, all numerical values relating to amounts, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

These representative embodiments are in no way limiting and are described solely to illustrate some aspects of the invention.

Further, the following examples are offered by way of illustration only and not by way of limitation.

EXAMPLES

TABLE 1

| % w/w | #1 | #2 |
|---|---|---|
| Clothianidin | 47.8 | 47.8 |
| graft copolymer | 5.0 | 5.0 |
| An acrylic (type) co-polymer having a backbone containing a carboxylated ethylenicallyethylenically unsaturated monomer and a non-carboxylated unsaturated monomer | 1.5 | 1.0 |
| A poly(ethylene oxide)-poly(propylene oxide)-poly(ethylene oxide) block copolymer having an average molecular weight of 4950 and a hydrophile weight percentage of 30% | 0.5 | — |
| Carnauba wax (25% emulsion in water) | 3.0 | 3.0 |
| Silicone emulsion | 0.3 | 0.3 |
| An acrylic copolymer in aqueous emulsion | 3.0 | 3.0 |
| 19.3% 1, 2-benzisothiazolin-3-one | 0.25 | 0.075 |
| Xanthan gum | 0.1 | 0.075 |
| Glycerol | 6.0 | 6.0 |
| Water + impurities from Clothianidin TG | 32.55 | 33.75 |

Tersperse® 2500 was used as the source of graft copolymer (Tersperse is a registered trademark of and available from Huntsman Petrochemical Corporation).

Envi-pol® 871 was used as the source of an acrylic (type) co-polymer having a backbone containing a carboxylated ethylenically unsaturated monomer and a non-carboxylated ethylenically unsaturated monomer (Envi-pol is a registered trademark of and available from Lamberti SPA).

Pluronic® P103 was used as the source of a poly(ethylene oxide)-poly(propylene oxide)-poly(ethylene oxide) block copolymer (Pluronic is a registered trademark of and available from BASF Corporation). Pluronic® P103 has an average molecular weight of 4950 and a hydrophile weight percentage of 30%.

Michem® Lube 156PFP (CAS #proprietary) is used as the source of carnauba wax (25% emulsion in water) and is a registered trademark of and available from Michelman Inc.

Xiameter® AFE-0010 was used the source of silicone emulsion (Xiameter is a registered trademark of and available from Dow Corning Corporation).

Emulson AG Coat US is used as the source of an acrylic copolymer in aqueous emulsion and is available from Lamberti SPA.

Proxel® GXL was used as the source of 19.3% 1, 2-benzisothiazolin-3-one (Proxel is a registered trademark of Arch UK Biocides and is available from Lonza).

Kelzan® CC was used as the source of xanthan gum (Kelzan is a registered trademark of and available from CP Kelco).

Example 1—Preparation of a Composition of the Invention

Method
Liquid Carrier Preparation

Glycerol was added to water while mixing to create a carrier. A graft copolymer and an acrylic (type) co-polymer having a backbone containing a carboxylated ethylenically unsaturated monomer and a non-carboxylated ethylenically unsaturated monomer were then added to the carrier. In a separate container, a 20% of EO-PO block co-polymer solution is made by dissolving poly(ethylene oxide)-poly(propylene oxide)-poly(ethylene oxide) block copolymer having an average molecular weight of 4950 and a hydrophile weight percentage of 30% in water with or without heating and a conventional low shear agitator. The 20% EP-PO block co-polymer solution was then added to the carrier while mixing Finally, a 25% emulsion of carnauba wax in water and a silicone emulsion were added to the carrier while mixing.

Mill Base Preparation

Clothianidin Technical (99.6% purity, supplied by from Jiangsu Flag Chemical Industry Co., Ltd.) is added to the carrier while stirring for 20 minutes until all clothianidin particles were wet to create a mixture. Then using a masket mill (Dispermat AE-C equipped with TML-1 basket milling system), the mixture was milled by using 1.2-1.7 mm zirconium oxide beads and grinding the mixture to the median particle size range of 1.8 to 2.8 microns.

Finishing Formulation Preparation

In a separate container, 1.5% of xanthan gum and 2.5% of 1, 2-benzisothiazolin-3-one were pre-dissolved in water to create a solution. The solution, an acrylic copolymer in aqueous emulsion and remaining water were added to the mill base while mixing for 45 minutes to 1 hour.

Example 2—Surfactant Screening

TABLE 2

| % w/w | A |
|---|---|
| Clothianidin | 47.8 |
| Surfactant | 0.5-2.0 |
| graft copolymer | 1.5 |
| Polyvinyl alcohol, partially hydrolyzed (24% solution in water) | 5.67 |
| 2,4,7,9-tetramethyl-5-decyne-4,7-diol (50% solution in propylene glycol) | 0.063 |
| Carnauba wax (25% emulsion in water) | 3.0 |
| Silicone emulsion | 0.1 |
| Xanthan gum | 0.05 |
| 5-chloro-2-methyl-4-isothiazolin-3-one and 2-methyl-4-isothiazolin-3-one, solution in water | 0.05 |
| Glycerol | 5.0 |
| Water | Q.S. |

Selvol® 24-203 (CAS #25213-24-5) is used as the source of polyvinyl alcohol, partially hydrolyzed (24% solution in water) and is a registered trademark of and available from Sekisui Specialty Chemicals America LLC.

Surfynol® 104PG-50 (CAS #126-86-3) is used as the source of 2,4,7,9-tetramethyl-5-decyne-4,7-diol (50% solution in propylene glycol) and is a registered trademark of and available from Air Products and Chemicals Inc.

Kathon® CG/ICP (CAS #26172-55-4 and 2682-20-4) is used as the source of 5-chloro-2-methyl-4-isothiazolin-3-one and 2-methyl-4-isothiazolin-3-one, solution in water. They are a registered trademark of and available from Rohm and Haas Company.

Method

Formulation A of Table 2, above, was formulated without an additional surfactant or with one of each of the 13 surfactants from Table 3, below. These 14 formulations were subjected to 54° C. for 2 weeks. Following storage at the accelerated storage conditions, the 14 formulations were measured for bottom clear time, viscosity and sprayability. Results of this experiment are shown in Table 3, below.

Bottom clear time is the time until the composition flows away from the container bottom when 62.5 milliliters of the composition is placed in a 125-milliliter plastic jar and placed on its side. A high bottom clear time indicates poor flowability stability.

Sprayability is based on the following test procedure and calculation. A 100-mesh (150 micrometer) sieve is weighed and the weight is recorded as the tare weight ("W0"). The sieve is then placed over a wide mouth jar.

The 50-60 grams of composition ("W") was weighed and was poured through the sieve followed by rinsing. Rinsing was done using tap water at a flow rate at about 1.5 liters per minute for one minute. The sieve with the residue was then placed in a drying oven and dried to create the dry sieve with the residue ("W1"). Percent sprayability was then calculated with the following equation: (W1−W0)/W*100.

TABLE 3

| Surfactant | Bottom Clear Time (sec) | Viscosity |
|---|---|---|
| None | 120 | 135 |
| Pluronic ® P103 | 50 | 227 |
| Pluronic ® P104 | 50 | 228 |
| Pluronic ® P105 | 60 | 243 |
| Tersperse ® 4894 | 105 | 225 |
| Tersperse ® 2500 | 600 | 181 |
| Reax ® 907 | 140 | 173 |
| Reax ® 85 A | 300 | 220 |
| Easysperse ™ P20 | 60 | 419 |
| Agrilan ® 755 | 75 | — |
| Envi-pol ® 871 | 0 | 226 |
| Sorbitol TD | 60 | 300 |
| Glycerol | 120 | 300 |
| Selvol ® 24-203 | 180 | 246 |

Pluronic® P103 is a poly(ethylene oxide)-poly(propylene oxide)-poly(ethylene oxide) block copolymer having an average molecular weight of 4950 and a hydrophile weight percentage of 30%.

Pluronic® P104 is a poly(ethylene oxide)-poly(propylene oxide)-poly(ethylene oxide) block copolymer (Pluronic is a registered trademark of and available from BASF Corporation). Pluronic® P104 has an average molecular weight of 5900 and a hydrophile weight percentage of 40%.

Pluronic® P105 is a poly(ethylene oxide)-poly(propylene oxide)-poly(ethylene oxide) block copolymer (Pluronic is a registered trademark of and available from BASF Corporation). Pluronic® P105 has an average molecular weight of 6500 and a hydrophile weight percentage of 50%.

Tersperse® 4894 is an alkylphenol ethoxylate free nonionic wetter and dispersant package (Tersperse is a registered trademark of and available from Huntsman Petrochemical Corporation).

Tersperse® 2500 is a graft copolymer.

Reax® 907 is a lignin, alkali, reaction product with formaldehyde and sodium bisulfite (Reax a registered trademark of and available from Ingevity).

Reax® 85A is a ligni, alkali, reaction products with disodium sulfite and formaldehyde.

Easysperse™ P20 is a spray-dried, optimized composite polyvinyl pyrrolidone and methyl vinyl ether/maleic acid half ester dispersant (Easysperse is a registered trademark of and available from Ashland).

Agrilan® 755 is a soft anionic polymer based on a methyl methacrylate backbone grafted with PEG (Agrilan is a registered trademark of and available from Nouryon).

Envi-pol® 871 is an acrylic (type) co-polymer having a backbone containing a carboxylated ethylenically unsaturated monomer and a non-carboxylated ethylenically unsaturated monomer.

Selvol® 24-203 is a polyvinyl alcohol, partially hydrolyzed (24% solution in water) and is a registered trademark of and available from Sekisui Specialty Chemicals America LLC.

Results

As seen in Table 2, above, the addition of an acrylic (type) co-polymer having a backbone containing a carboxylated ethylenically unsaturated monomer and a non-carboxylated ethylenically unsaturated monomer resulted in no settling as evidenced by the less than 25 second bottom clear time. Other properties of the formulation are as follow: specific gravity of 1.26, pH is around 6, viscosity is ranged 200 cP-300 cp at 50 $S^{-1}$, sprayability with 100 mesh screen (150 micron opening) is ranged 0-0.1%.

Example 3-Flowability of Compositions of the Invention

Method

Formulation #1 and #2 from Table 1, above, was compared to the commercially available NipsIt® INSIDE formulation (See Table 5, below, for NipsIt® INSIDE ingredients). Specifically, formulation #1 and #2 and NipsIt® INSIDE were stored at various conditions as detailed in Table 3, below. Follow storage at accelerated conditions bottom clear time was assessed. Results of this experiment can be found in Table 4, below.

TABLE 4

| | Bottom Clear Time (sec) | | |
|---|---|---|---|
| Storage Condition | NipsIt ® INSIDE | Formulation #1 | Formulation #2 |
| 5 cycles of Freeze/Thaw | 2-50 | 0 | 0 |
| 54° C. for 2 weeks | 75-120 | 0 | 9 |
| 50° C. for 4 weeks | 80-120 | 0 | n/a |
| lower than −15° C. for 8 weeks | 0-10 | 0 | 0 |
| 40° C. for 8 weeks | 45-120 | 0 | n/a |
| 50° C. for 8 weeks | 300-1200 | 10 | 10 |
| 4° C. for 16 weeks | 10-60 | 0 | n/a |
| 40° C. for 16 weeks | 105-420 | 8 | 0 |
| 25° C. for 6 months | 90-135 | 0 | n/a |
| 25° C. for 1 year | 150-390 | 25 | n/a |

TABLE 5

| | % w/w |
|---|---|
| Clothianidin TG (97.5%) | 49.0 |
| Michem ® Lube 156P | 3.0 |
| Selvol ® 24-203 | 5.67 |
| Glycerol | 4.3 |
| Sorbitol 70% solution | 6.14 |
| Tersperse ® 2500 | 1.17 |
| Stepfac ® TSP PE-K | 0.244 |
| Surfynol ® 104PG | 0.063 |
| Due-O-Set ® E 200 | 2.8 |
| Kathon ® CG/ICP | 0.05 |
| Kelzan ® CC | 0.035 |
| Water | 27.528 |

Result

As seen in Table 4, above, formulation #1 and #2 had superior bottom clear time than NipsIt® INSIDE under every storage condition tested. Thus, the specific combination of excipients in Formulation #1 and #2 provides superior stability to the commercially available NipsIt® INSIDE.

What is claimed is:

1. A pesticidal composition comprising clothianidin, a graft copolymer, an acrylic co-polymer having a backbone containing a carboxylated ethylenically unsaturated monomer and a non-carboxylated ethylenically unsaturated monomer and a poly(ethylene oxide)-poly(propylene oxide)-poly(ethylene oxide) block copolymer having an average molecular weight from about 4950 to about 6500 and a hydrophile weight percentage from about 30% to about 50%, wherein the hydrophile weight percentage is provided by the poly(ethylene oxide).

2. The composition of claim 1, further comprising water.

3. The composition of claim 1, further comprising an excipient selected from the group consisting of a slip agent, a liquid humectant, an anti-foam agent, a polymer emulsion, a preservative and a thickener.

4. The composition of claim 3, wherein the slip agent is a 25% emulsion of carnauba wax in water.

5. The composition of claim 3, wherein the liquid humectant is glycerol.

6. The composition of claim 3, wherein the anti-foam agent is a silicone emulsion.

7. The composition of claim 3, wherein the polymer emulsion is an acrylic copolymer in aqueous emulsion.

8. The composition of claim 3, wherein the preservative is 19.3% 1, 2-benzisothiazolin-3-one.

9. The composition of claim 3, wherein the thickener is xanthan gum.

10. A pesticidal composition comprising:
from about 10% to about 60% w/w clothianidin;
from about 1% to about 10% w/w of a graft copolymer;
from about 0.1% to about 10% w/w of an acrylic co-polymer having a backbone containing a carboxylated ethylenically unsaturated monomer and a non-carboxylated ethylenically unsaturated monomer; and
from about 0.1% to about 10% w/w of and a poly(ethylene oxide)-poly(propylene oxide)-poly(ethylene oxide) block copolymer having an average molecular weight of 4950 and a hydrophile weight percentage of 30%, wherein the hydrophile weight percentage is provided by the poly(ethylene oxide),
wherein w/w denotes weight by total weight of the composition.

11. The composition of claim 10, comprising:
from about 40% to about 60% w/w clothianidin;
from about 3% to about 7% w/w of a graft copolymer;
from about 0.5% to about 2.5% w/w of an acrylic co-polymer having a backbone containing a carboxylated ethylenically unsaturated monomer and a non-carboxylated ethylenically unsaturated monomer; and
from about 0.1% to about 1% w/w of and a poly(ethylene oxide)-poly(propylene oxide)-poly(ethylene oxide) block copolymer having an average molecular weight of 4950 and a hydrophile weight percentage of 30%.

12. A pesticidal composition comprising:
about 47.8% w/w clothianidin;
about 5.0% w/w of a graft copolymer;
about 1.5% w/w of an acrylic (type) co-polymer having a backbone containing a carboxylated ethylenically unsaturated monomer; and
about 0.5% w/w of a non-carboxylated ethylenically unsaturated monomer and a poly(ethylene oxide)-poly(propylene oxide)-poly(ethylene oxide) block copolymer having an average molecular weight of 4950 and a hydrophile weight percentage of 30%, wherein the hydrophile weight percentage is provided by the poly(ethylene oxide),
wherein w/w denotes weight by total weight of the composition.

13. The composition of claim 12, further comprising:
about 3.0% w/w of a 25% emulsion of carnauba wax in water;
about 0.3% w/w of a silicone emulsion;
about 3.0% w/w of an acrylic copolymer in aqueous emulsion;
about 0.25% w/w of 19.3% 1, 2-benzisothiazolin-3-one;
about 0.1% w/w of xanthan gum;
about 6.0% w/w glycerol; and
about 32.6% w/w water.

14. A method of controlling a pest comprising applying the composition of claim 1 to an area in need of pest control.

15. The method of claim 14, wherein the pest is an aphid or a wireworm.

* * * * *